United States Patent [19]

Ernst et al.

[11] Patent Number: 5,327,796
[45] Date of Patent: Jul. 12, 1994

[54] HORN SWITCH ACTUATED BY ROCKING AIR BAG MODULE

[75] Inventors: David L. Ernst, Kettering; Maria T. Avila, Vandalia; David S. Weckesser, Dayton, all of Ohio

[73] Assignee: General Motors Corporation, Detroit, Mich.

[21] Appl. No.: 997,361

[22] Filed: Dec. 28, 1992

[51] Int. Cl.⁵ .................. H01H 9/00; B60R 21/08
[52] U.S. Cl. ................. 74/484 H; 200/61.55; 280/731
[58] Field of Search ............. 74/484 H; 200/61.54, 200/61.55; 280/731

[56] References Cited

U.S. PATENT DOCUMENTS

| | | | |
|---|---|---|---|
| 3,819,205 | 6/1974 | Dunford et al. | 280/150 |
| 4,785,144 | 11/1988 | Fosnaugh et al. | 200/61.55 |
| 4,963,704 | 10/1990 | Buma et al. | 200/61.55 |
| 5,085,462 | 2/1992 | Gualtier | 280/731 |
| 5,228,362 | 7/1993 | Chen et al. | 200/61.55 |
| 5,235,146 | 8/1993 | Suzuki | 200/61.54 |
| 5,239,147 | 8/1993 | Allard et al. | 200/61.55 X |

Primary Examiner—Allan D. Herrmann
Attorney, Agent, or Firm—Charles E. Leahy

[57] ABSTRACT

A steering wheel hub includes a mounting plate which mounts the base of an air bag module on a pair of spaced posts. In one embodiment a pair of horn actuation switches in the form of spring contacts are mounted on the mounting plate between the posts and the upper edge of the plate. The spring contacts are insulated and bias the plates apart. Depressing the upper portion of the air bag module rocks the module on the posts, which deflects the spring contacts into electrical contact with the mounting plate and blows the horn. In another embodiment, the base plate is mounted on the mounting plate by two spaced posts which mount compression springs biasing the plates apart. Modular horn actuation switches are mounted between the posts and the plate upper edge. Depressing the upper portion of the air bag module rocks the base plate into engagement with the switches to blow the horn. In a variation, the modular horn switches are located between the posts and the plate lower edge, which enable horn blowing by depressing the lower portion of the air bag module.

14 Claims, 3 Drawing Sheets

U.S. Patent    July 12, 1994    Sheet 1 of 3    5,327,796
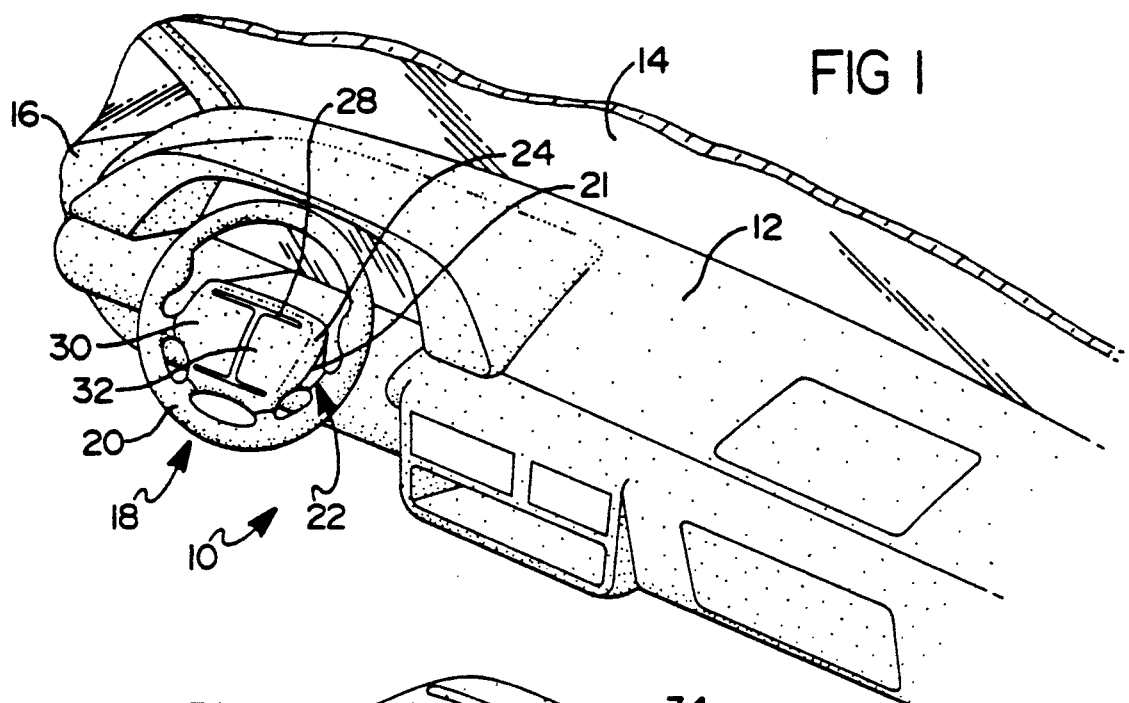
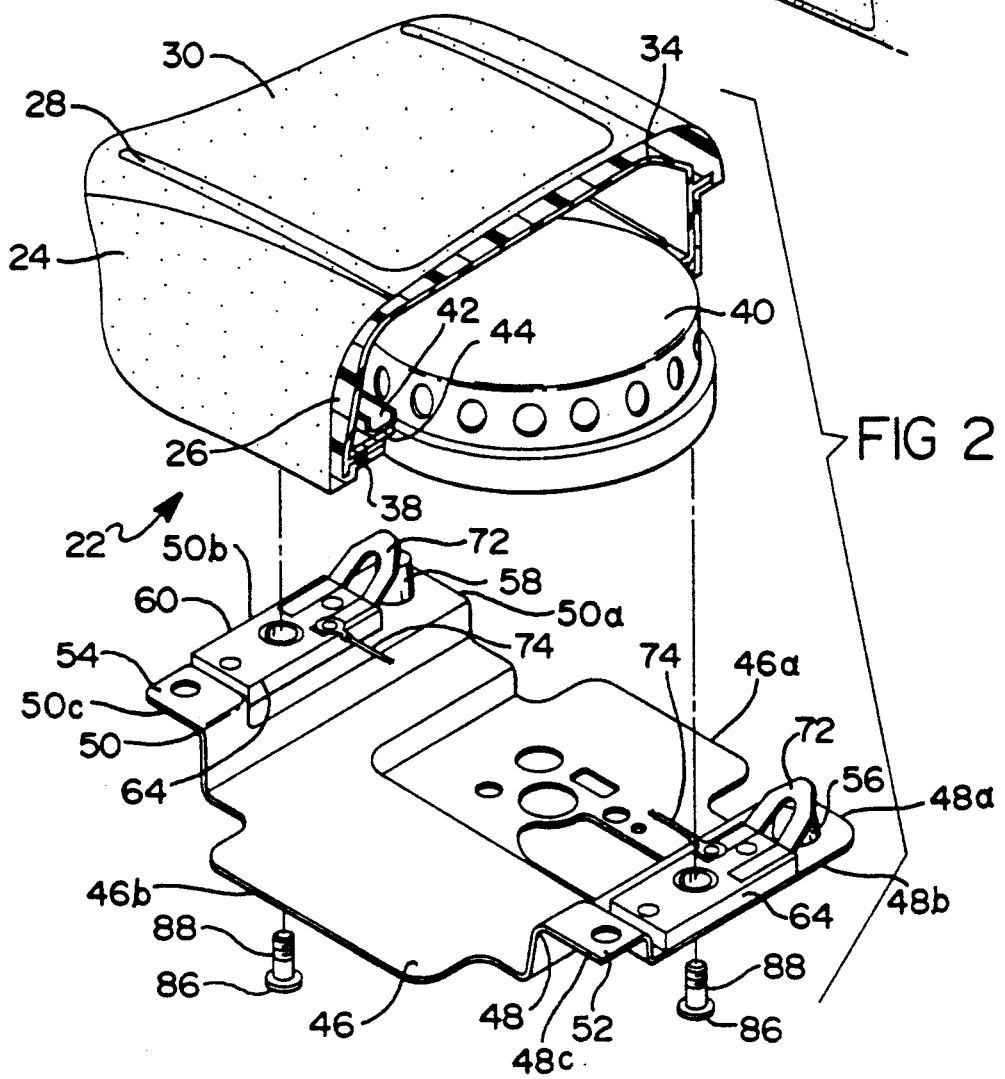

HORN SWITCH ACTUATED BY ROCKING AIR BAG MODULE

BACKGROUND OF THE INVENTION

This invention relates generally to switches for actuating, or "honking" a vehicle horn and, more particularly, to a horn switch actuated by rocking an air bag module mounted on a steering wheel.

Prior to the mounting of air bags within steering wheel hubs, many different types of horn actuators were used. Many years ago, a horn actuation ring was placed about the steering wheel hub within easy reach of the driver's thumbs. More recently, the horn switch or switches were relocated for actuation by depressing the steering wheel hub. This arrangement allows the driver to simply depress the steering wheel hub at any location to actuate the horn. This central location became so standard that drivers instinctively depress the steering wheel hub when they desire to honk the horn.

Most currently-produced automotive passenger vehicles are manufactured with driver-side air bags as standard equipment. This air bag is included in a module that is usually stored in a compartment within the steering wheel hub beneath a vinyl covering. Upon actuation, the deploying air bag fragments this vinyl covering into cover doors which open to free the air bag. This location of the air bag module and cover doors in the steering wheel hub necessitates switch relocation. Placing the horn actuation switches for easy and reliable accessibility by the driver presents an ergonomic problem.

One solution to this switch placement problem is shown in U.S. Pat. No. 3,819,205—Dunford et al. There, the horn actuation switches are relocated to the four steering wheel hubs, away from the path of air bag deployment. With this placement of the switches so near the steering wheel rim, the opportunity for inadvertent horn actuation is increased. Also, this placement now requires a thoughtful, rather than instinctive, effort to actuate the horn by any driver who has become accustomed to the central steering wheel hub switch location.

Another proposed solution to this problem is illustrated in U.S. Pat. No. 5,058,462—Gaultier, in which the horn actuation switches are mounted in one of the air bag cover doors atop the air bag module. However, placement of the horn actuation switches on top of the air bag module runs the risk that the switches could inadvertently be exploded into the passenger compartment upon air bag deployment, thus creating a hazard.

Yet another proposed solution is related in U.S. Pat. No 4,785,144—Fosnaugh et al. Here, the air bag module is suspended on a plate by four telescoping spring-biased corner posts, which incorporate horn actuation switch contacts. Depressing any portion of the air bag module against the spring bias will close the contacts and blow the horn. Although this four-corner suspension arrangement permits horn actuation by the familiar act of depressing the steering wheel hub, it has been found to be susceptible to involuntary brief horn actuation, known as "chirp", by vibrations when the vehicle encounters rough pavement.

It would be desirable to provide a horn actuation switch arrangement which permits horn actuation by depressing the steering wheel hub, but which avoids involuntary horn chirp.

SUMMARY OF THE INVENTION

It is therefore an object of this invention to provide a horn actuation switch arrangement which permits horn actuation by depressing the steering wheel hub, but which avoids involuntary horn chirp.

In one aspect, this invention features a vehicle steering wheel assembly having a central mounting plate, an air bag module including a base plate having spaced peripheral edges, and a horn switch operable to actuate a vehicle horn. A pair of spaced posts mount the base plate for rocking movement toward the mounting plate about a pivot axis and a spring biases the plates apart. The horn switch is mounted between the plates between the pivot axis and one of the peripheral edges, so that rocking movement of the module to move the one base plate peripheral edge toward the mounting plate about the pivot axis operates the horn switch.

Preferably, the base plate includes spaced side edges, the horn switch is mounted on the mounting plate beneath one of the base plate side edges, and a second horn switch is mounted on the mounting plate beneath the other base plate side edge between the posts and the upper base plate edge. This enables operation of one of the horn switches upon movement of only one upper edge of the base plate toward the mounting plate.

In another aspect, this invention features a vehicle steering wheel assembly comprising a central mounting plate having spaced peripheral edges, an air bag module including a base plate having corresponding spaced peripheral edges, and a horn switch operable to actuate a vehicle horn. Mating abutments located on the mounting plate and on the base plate adjacent one of their peripheral edges define a pivot axis. A pair of spaced posts located on the mounting plate between the other peripheral edges and the mating abutments mount the base plate for movement toward the mounting plate. A spring located between the posts and the other peripheral edges bias the other edges of the plates apart and the base plate to rock on the posts to engage the base plate mating abutments. The horn switch is mounted between the posts and the plate edges, so that movement of the module moves the other base plate peripheral edge toward the mounting plate about the pivot axis to operate the horn switch.

In yet another aspect, this invention features a vehicle steering wheel assembly having a central mounting plate, an air bag module including a base plate having spaced peripheral edges, and a horn switch operable to actuate a vehicle horn. A pair of spaced posts are located on the mounting plate between the spaced peripheral edges of the base plate to mount the base plate for movement of one of its peripheral edges toward the mounting plate and a spring carried by the posts biases the plates apart. The horn switch is mounted between the plates between the posts and one of the edges, so that movement of the module on the posts moves the one base plate peripheral edge toward the mounting plate to operate the horn switch.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 1 is a partial perspective view of an automobile instrument panel and steering wheel incorporating a driver's side air bag;

FIG. 2 is an exploded perspective view of a driver's side air bag module mounting arrangement, partially broken away to illustrate one embodiment of a horn switch according to this invention mounted between the steering wheel mounting plate and the air bag module base plate;

DETAILED DESCRIPTION OF PREFERRED EMBODIMENTS

Figure 3:
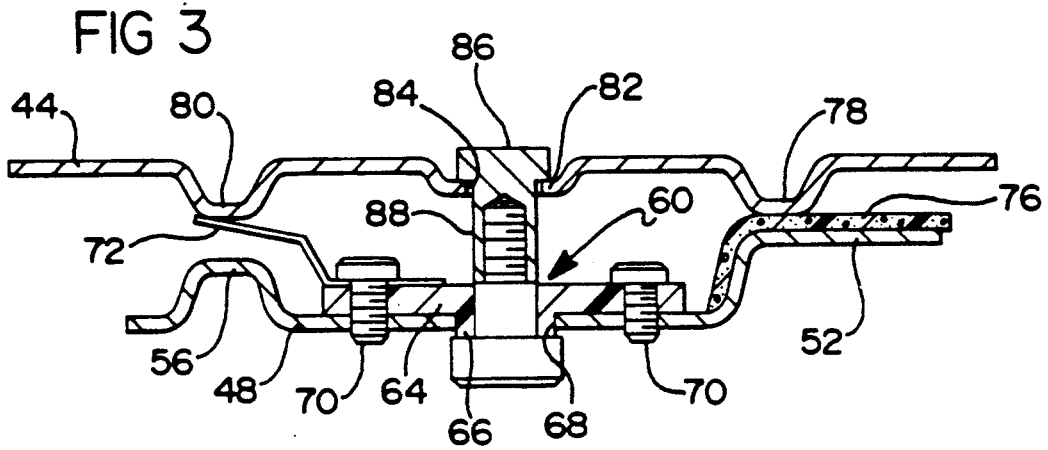
FIG. 3 is an enlarged partial sectional view illustrating the horn switch, steering wheel mounting plate and air bag module base plate of FIG. 2.

FIG. 1 shows the front seat area of a passenger vehicle passenger compartment 10. An instrument panel 12 is mounted behind a windshield 14 between the vehicle side access doors, only the left door 16 being shown. A steering wheel 18 projects from beneath instrument panel 12 on the driver's side of passenger compartment 10. Steering wheel 18 includes a rim 20 which is mounted on a hub 21 which also mounts an air bag module 22.

As shown in FIGS. 1 and 2, air bag module 22 includes a laminated cover 24 comprising a flexible vinyl outer layer 26 which incorporates an I pattern groove 28 that defines a pair of cover doors 30 and 32. Cover 24 includes an inner thermoplastic base layer 34, known as a container. Cover 24 incorporates an inner flange 38. A conventional circular air bag inflator 40 includes a peripheral mounting flange 42. A stamped metal air bag module base plate 44 has a circular central opening for receiving inflator 40 and is clamped between flanges 38 and 42 by conventional fasteners, not shown. The space between the top of inflator 40 and the container 34 is occupied by the usual air bag, not shown.

Referring now to FIGS. 1, 2 and 3, steering wheel hub 21 includes a stamped metal mounting plate 46 which incorporates a pair of stepped side flanges 48 and 50 bounded by peripheral top edges 48a and 50a, side edges 48b and 50b, and bottom edges 48c and 50c. At their lower edges, 48c, 50c flanges 48 and 50 incorporate integral stamped spaced abutments 52 and 54. Adjacent their upper edges 48c, 50a, flanges 48 and 50 incorporate a pair of integral stamped contacts 56 and 58. Contacts 56 and 58 are frustoconical in shape and are not as high as abutments 52 and 54.

Switch contact units 60 are mounted on flange 48 between abutment 52 and contact 56 and on flange 50 between abutment 54 and contact 58. FIG. 3 illustrates switch contact unit 60 mounted on flange 48 and its mounting in detail. Switch contact unit 60 includes a flat body 64 made of plastic or other electrically non-conductive material and includes a depending boss 66 which fits snugly in locating hole 68 in flange 48, where it is secured by screws 70. Contact switch unit 60 mounts a stepped spring metal contact 72 which is connected to a hot lead 74 (see FIG. 2). Abutments 52 and 54 are electrically insulated from module base plate 44 by a polyurethane foam layer or cap 76, which is molded over mounting plate 46 during the reaction injection molding process used in the formation of steering wheel 18.

Air bag module base plate 44 includes integral, depending, spaced stamped bosses or abutments 78 and 80 and an apertured depending boss 82 having a hole 84 located between them on each side (only one side shown). A two-headed threaded fastener 86 having a post 88 which extends through the apertures in bosses 66 and 82 to mount each side of base plate 44 to mounting plate 46. As mounted, boss 78 engages cap 76 atop abutment 52, while boss 80 engages spring contact 72.

As illustrated in FIG. 3, the aperture in boss 82 is larger than post 88. This allows base plate 44 to rock on the posts 88. Switch contacts 60 are mounted on base plate 44, but are electrically insulated from it. Spring contacts 72 bias plates 44 and 46 apart and rock base plate 44 on posts 88 to engage and mate with bosses 78 with abutments 52 and 54.

The provision of a pair of switches at the upper corners of the air bag module enables the driver to actuate the vehicle horn by depressing the upper portion of air bag module 22 centrally or on either side. This action will rock base plate 44 on one or both posts 88, depressing one or both bosses 80 against the biasing force of spring contact 72 until one or both engage contacts 56 and/or 58. This operates the switch by grounding the horn actuation circuit, blowing the vehicle horn.

Figure 4:
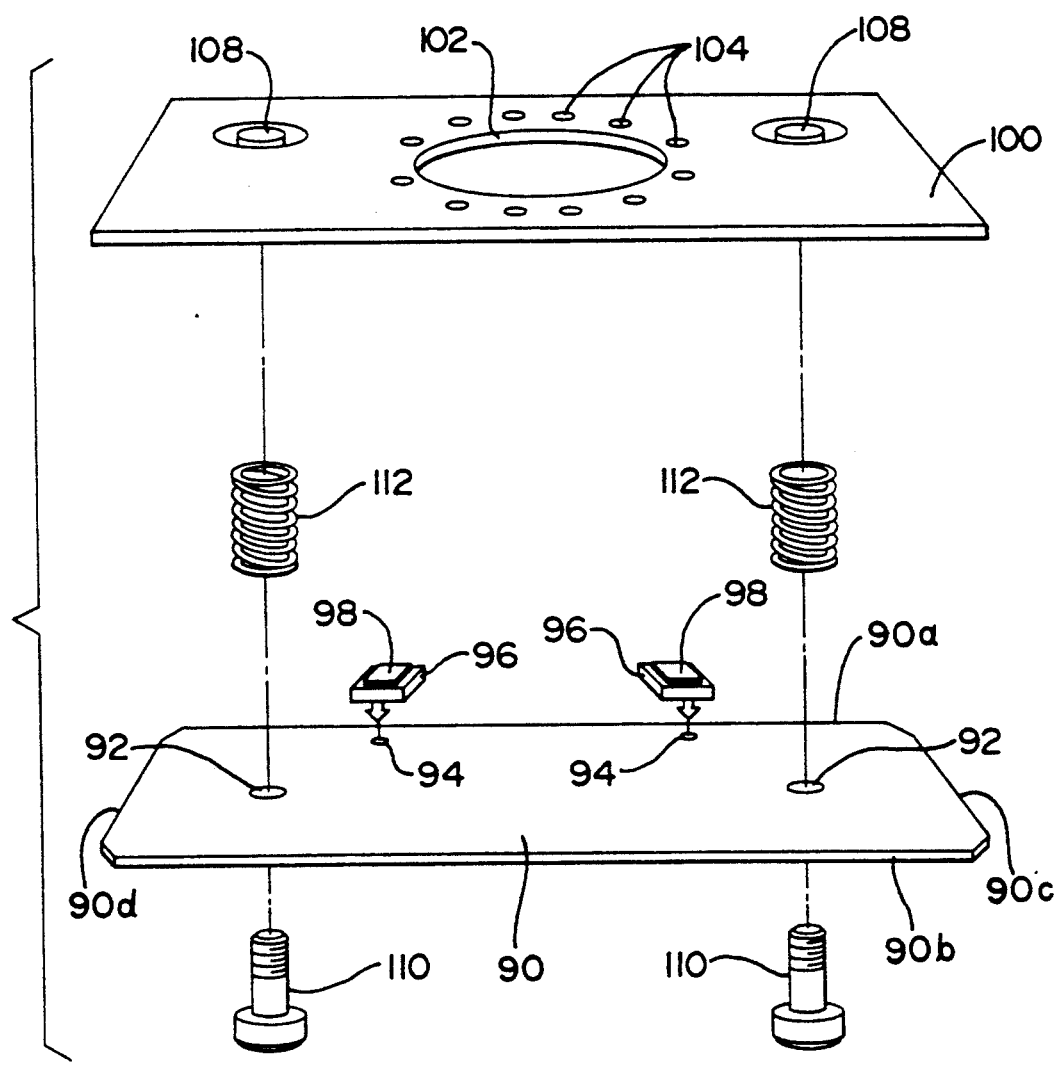
FIG. 4 is an exploded perspective view of a steering wheel mounting plate, horn switch and air bag module base plate, according to another embodiment of this invention.
Figure 5:
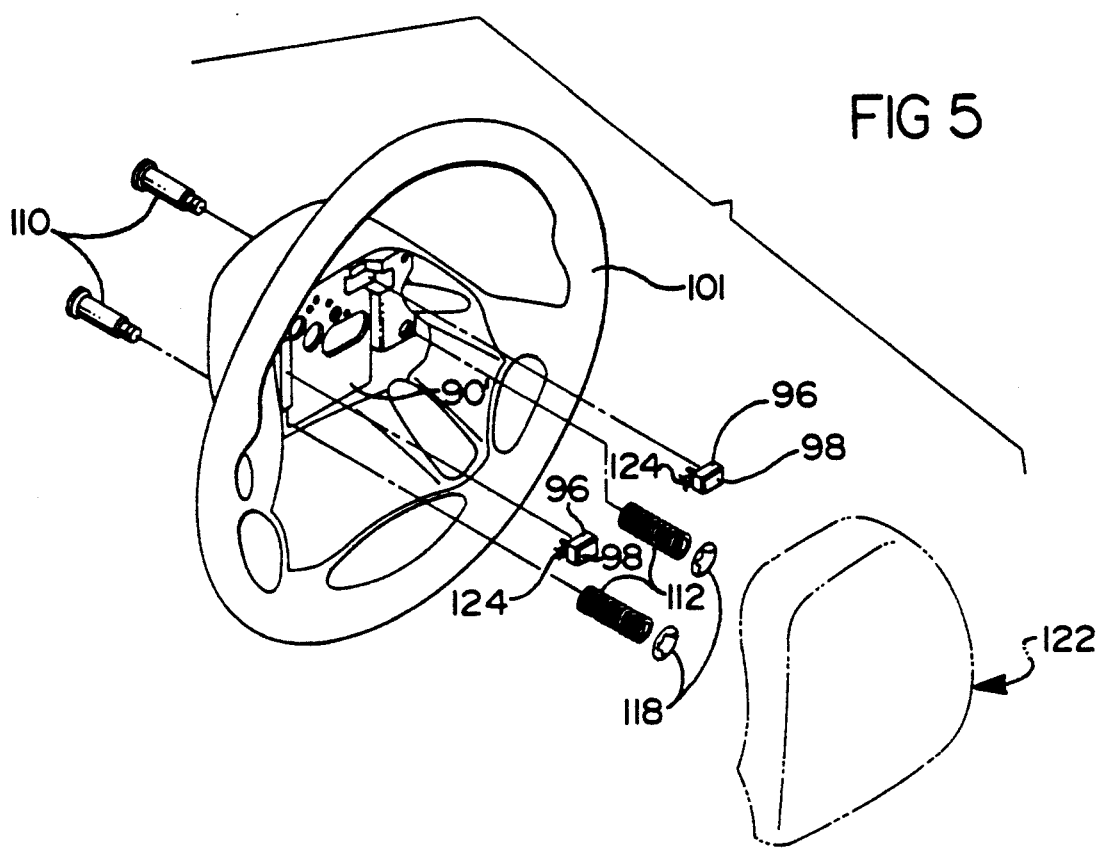
FIG. 5 is an exploded perspective view of another embodiment of a driver's side air bag module mounting arrangement, partially broken away to illustrate one embodiment of a horn switch according to this invention mounted between the steering wheel mounting plate and the air bag module base plate.
Figure 6:
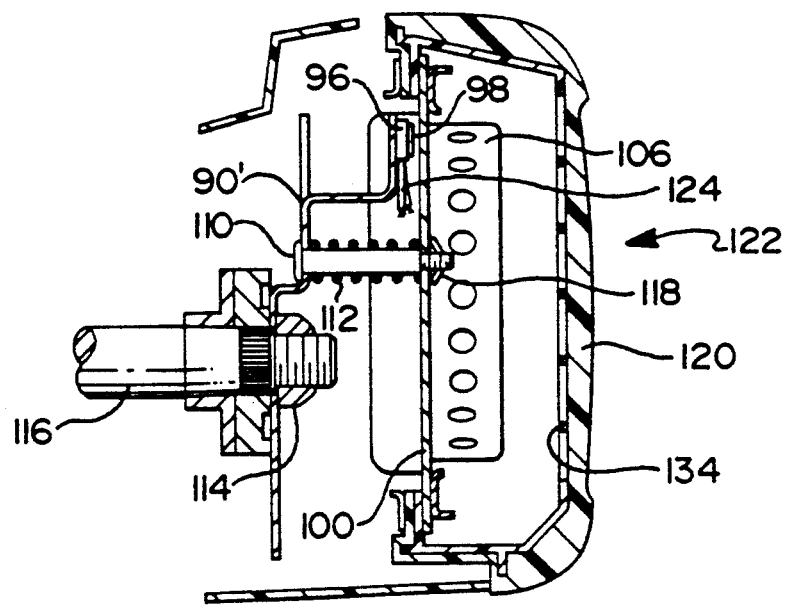
FIG. 6 is a longitudinal sectional view of the mounting arrangement of FIG. 5.

Another embodiment of this invention is illustrated in FIGS. 4, 5 and 6. FIG. 4 shows a simplified prototype arrangement, while the production version of this embodiment is shown in FIGS. 5 and 6. A mounting plate 90 has a pair of spaced holes 92 located between top and bottom edges 90a, 90b centrally of each side adjacent edges 90c, 90d. Another pair of spaced holes 94 are located adjacent the upper edge 90a of plate 90 to mount modular horn actuation switches 96 having actuation buttons 98. Unlike the FIGS. 1-3 embodiment, these modular switches 96 are self-contained and incorporate both electrical contacts.

An air bag module base plate 100 incorporates a central aperture 102 and peripheral spaced holes 104 for mounting an inflator 106. Plate 100 includes spaced threaded bosses 108 which align with holes 92 in mounting plate 90. A pair of headed threaded studs 110 extend through holes 92, capture coil compression springs 112, and are received through bosses 108. When installed, studs 110 become posts which mount base plate 100 to mounting plate 90.

As shown in FIGS. 5 and 6, mounting plate 90' is a complex metal stamping that supports the steering wheel 101 and is bolted at 114 to steering column 116. The end of studs 110 are captured by push nuts 118. Springs 112 bias plates 90' and 100 apart and maintain base plate 100 above and slightly spaced from horn actuation buttons 98.

To blow the vehicle horn, the driver depresses the upper portion of cover 120 of air bag module 122 (here shown without the air bag). This will rock base plate 100 on posts 110 and depress horn actuation button(s) 98 to operate the switch(es) 96 by closing their contacts, which are connected to the horn via leads 124.

In both embodiments the springs bias the air bag module base plate and the steering wheel mounting plate apart with sufficient force to prevent horn actuation caused by vehicle vibration. The location of the horn actuation switches at the top edge 90a of the mounting plate enables gravity to assist in the prevention of horn chirp. Horn actuation is easily accomplished by the vehicle driver who has his hands at the adjacent "10 and 2 o'clock" positions on the steering wheel.

Thus, both embodiments of this invention described above will function to provide a horn actuation switch arrangement which permits horn actuation by depressing the steering wheel hub to operate the switch, but which avoids inadvertent horn chirp.

While only preferred embodiments have been illustrated and described, obvious modifications thereof are contemplated within the scope of this invention and the following claims.

For example, the FIGS. 1-3 embodiment could be inverted so that the horn could be actuated by depressing the lower portion of the air bag module. Similarly, the FIGS. 4-6 embodiment could also be inverted. Additionally, the horn switches could be located both above and below the pivot posts, enabling horn actuation by depressing either the top or bottom portion of the air bag module.

We claim:

1. In a vehicle steering wheel assembly having a central mounting plate, an air bag module including a base plate having spaced peripheral edges, and a horn switch operable to actuate a vehicle horn, means mounting the base plate on the mounting plate, comprising a pair of spaced posts located centrally between the peripheral edges of the mounting plate which mount the base plate for rocking movement thereon toward the mounting plate, spring means biasing the plates apart, and means mounting the horn switch between the plates between the posts and one of said peripheral edges, whereby rocking movement of the module on the posts to move said one base plate peripheral edge toward the mounting plate operates the horn switch.

2. The mounting means of claim 1, wherein the base plate peripheral edges are the upper and lower edges.

3. The mounting means of claim 2, wherein said one peripheral edge is the upper edge.

4. The mounting means of claim 3, wherein the horn switch is mounted on the mounting plate.

5. The mounting means of claim 4, wherein the base plate includes spaced side edges, the horn switch is mounted on the mounting plate beneath one of the base plate side edges, and including a second horn switch mounted on the mounting plate beneath the other base plate side edge between the posts and the upper base plate edge, thereby enabling operation of one of the horn switches upon movement of only one upper edge of the base plate toward the mounting plate.

6. In a vehicle steering wheel assembly comprising a central mounting plate having spaced peripheral edges, an air bag module including a base plate having corresponding spaced peripheral edges, and a horn switch operable to actuate a vehicle horn, mounting means comprising mating abutments located on the mounting plate and on the base plate adjacent one of their peripheral edges, a pair of spaced posts located on the mounting plate between the other peripheral edges and the mating abutments which mount the base plate for movement toward the mounting plate, spring means located between the posts and the other peripheral edges for biasing said other edges of the plates apart and rocking the base plate on the posts to engage the base plate mating abutments, and means mounting the horn switch between the posts and the plate edges, whereby movement of the module moves said other base plate peripheral edge toward the mounting plate to operate the horn switch.

7. The mounting means of claim 6, wherein the mating abutments on the mounting plate and on the base plate are electrically insulated from each other and the horn switch comprises a pair of contacts, one of which is mounted on one of the plates, and the other of which is the spring that is mounted on an insulator on said one plate, whereby movement of the module to move said one base plate peripheral edge toward the mounting plate deforms the spring to engage the contacts and operate the switch.

8. The mounting means of claim 7, wherein said peripheral edges are the upper and lower edges of the plates and said one plate peripheral edge is the upper edge.

9. The mounting means of claim 8, wherein the base plate includes spaced side edges, the first pair of contacts are mounted on the mounting plate beneath one base plate side edge, and including a second pair of contacts, one of which is mounted on the mounting plate and the other of which is the spring that is mounted on an insulator on the mounting plate beneath the other base plate side edge between the posts and the upper base plate edge, thereby enabling movement of only one upper edge of the base plate toward the mounting plate to deform a spring to engage the contacts and operate the switch.

10. In a vehicle steering wheel assembly having a central mounting plate, an air bag module including a base plate having spaced peripheral edges, and a horn switch operable to actuate a vehicle horn, mounting means comprising a pair of spaced posts located on the mounting plate between the spaced peripheral edges of the base plate and mounting the base plate for movement of one of its peripheral edges toward the mounting plate, spring means carried by the posts for biasing the plates apart, and means mounting the horn switch between the plates between the posts and one of the edges, whereby movement of the module on the posts moves the one base plate peripheral edge toward the mounting plate to operate the horn switch.

11. The mounting means of claim 10, wherein said peripheral edges of the base plate are its upper and lower edges, and said one peripheral edge is the upper edge.

12. The mounting means of claim 11, including a second horn switch mounted between the plates and located between the posts and the lower base plate peripheral edge, whereby movement of the module on the posts to move the lower base plate edge toward the mounting plate operates the second horn switch.

13. The mounting means of claim 11, wherein the spaced posts comprise headed shoulder bolts and fasteners confining the plates between the heads and fasteners, and the springs are coil compression springs confined between the plates to bias them apart.

14. The mounting means of claim 11, wherein the base plate includes spaced side edges,
the horn switch is mounted on the mounting plate adjacent one base plate side edge, and
including a second horn switch mounted on the mounting plate adjacent the other base plate side edge between the posts and the base plate upper peripheral edge, thereby enabling operation of a horn switch upon movement of only one upper edge of the base plate toward the mounting plate.

* * * * *